US012785904B2

(12) United States Patent
Liu

(10) Patent No.: US 12,785,904 B2
(45) Date of Patent: Nov. 3, 2026

(54) CODEBOOK FEEDBACK METHOD, APPARATUS, DEVICE, AND READABLE STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 341 days.

(21) Appl. No.: 18/578,687

(22) PCT Filed: Jul. 14, 2021

(86) PCT No.: PCT/CN2021/106262
§ 371 (c)(1),
(2) Date: Jan. 11, 2024

(87) PCT Pub. No.: WO2023/283826
PCT Pub. Date: Jan. 19, 2023

(65) Prior Publication Data
US 2024/0388408 A1 Nov. 21, 2024

(51) Int. Cl.
*H04W 72/04* (2023.01)
*H04L 5/00* (2006.01)
*H04W 72/11* (2023.01)

(52) U.S. Cl.
CPC ........... *H04L 5/0055* (2013.01); *H04W 72/11* (2023.01)

(58) Field of Classification Search
CPC ... H04L 5/0055; H04L 1/1685; H04L 1/1854; H04L 1/1864; H04W 72/11
See application file for complete search history.

(56) References Cited

U.S. PATENT DOCUMENTS

| | | | | |
|---|---|---|---|---|
| 2011/0113299 | A1 | 5/2011 | Power et al. | |
| 2022/0038218 | A1* | 2/2022 | Kim | H04L 1/1854 |
| 2022/0078832 | A1* | 3/2022 | Elshafie | H04W 72/21 |
| 2022/0232592 | A1* | 7/2022 | Dimou | H04L 1/1861 |
| 2022/0311581 | A1* | 9/2022 | Elshafie | H04W 72/0446 |
| 2022/0322375 | A1* | 10/2022 | Huang | H04W 72/044 |
| 2023/0057476 | A1* | 2/2023 | Li | H04L 1/1822 |
| 2023/0093477 | A1* | 3/2023 | El Hamss | H04L 1/1854 370/329 |

(Continued)

FOREIGN PATENT DOCUMENTS

| | | | |
|---|---|---|---|
| CN | 108809374 | A | 11/2018 |
| CN | 109586877 | A | 4/2019 |

(Continued)

OTHER PUBLICATIONS

International Search Report of International Application No. PCT/CN2021/106262, dated Apr. 13, 2022, 4 pages.

(Continued)

*Primary Examiner* — Mahbubul Bar Chowdhury
(74) *Attorney, Agent, or Firm* — Finnegan, Henderson, Farabow, Garrett & Dunner, L.L.P.

(57) ABSTRACT

A codebook feedback method is performed by a terminal, and includes: reporting an enhanced Type 3 Hybrid Automatic Repeat Request Acknowledgement (HARQ-ACK) codebook to an access network device in response to a trigger rule being satisfied.

16 Claims, 4 Drawing Sheets

(56) References Cited

U.S. PATENT DOCUMENTS

| | | | | |
|---|---|---|---|---|
| 2023/0163885 | A1* | 5/2023 | Zhang | H04L 1/1822 370/329 |
| 2023/0291508 | A1* | 9/2023 | Blankenship | H04L 1/1861 |
| 2024/0072975 | A1* | 2/2024 | Rastegardoost | H04W 72/20 |
| 2024/0214160 | A1* | 6/2024 | Gao | H04L 5/0053 |

FOREIGN PATENT DOCUMENTS

| | | | |
|---|---|---|---|
| CN | 111149315 | A | 5/2020 |
| CN | 112042142 | A | 12/2020 |
| CN | 112511275 | A | 3/2021 |
| CN | 112821990 | A | 5/2021 |
| CN | 112839379 | A | 5/2021 |
| WO | 2018128474 | A1 | 7/2018 |

OTHER PUBLICATIONS

Qualcomm Incorporated, "HARQ-ACK enhancement for IOT and URLLC", 3GPP TSG RAN WG1 #105-e, R1-2104663, e-Meeting, May 10-27, 2021, 21 pages.

Moderator (Nokia), "Moderator summary #1 on HARQ-ACK feedback enhancements for NR Rel-17 URLLC/IIoT", 3GPP TSG-RAN WG1 Meeting #105-e, R1-2104314, e-Meeting, May 19-27, 2021, 41 pages.

Hu, Chao, et al., "HARQ parameter optimization in TD-SCDMA HSDPA system", Issue 1, 2008, China Academic Journal Electronic Publishing House, http://www.cnki.net, 4 pages.

The First Office Action for Chinese Application No. 202180002165.0, dated Jan. 24, 2025, 15 pages.

* cited by examiner

CODEBOOK FEEDBACK METHOD, APPARATUS, DEVICE, AND READABLE STORAGE MEDIUM

CROSS-REFERENCE TO RELATED APPLICATIONS

The present application is a U.S. National Stage of International Application No. PCT/CN2021/106262, filed on Jul. 14, 2021, the content of which is incorporated by reference herein in its entirety.

TECHNICAL FIELD

The present disclosure relates to the field of communications and, in particular, to a codebook feedback method, apparatus, device, and readable storage medium.

BACKGROUND

The R17 Ultra Reliable and Low Latency Communication (URLLC) topic includes a discussion of Type-3 codebook for retransmission of Hybrid Automatic Repeat request acknowledgements (HARQ-ACK) that are canceled or discarded due to resource collisions or priority issues.

However, the Type-3 codebook has the disadvantage of high overhead, so further enhancements should be made to the Type-3 type codebook to reduce the feedback overhead of the Type-3 codebook. For the enhanced Type-3 HARQ-ACK codebook for Semi-Persistent Scheduling (SPS) Physical Downlink Shared Channel (PDSCH) only, the SPS PDSCH is usually transmitted by the RRC semi-static configuration. When and how to trigger the enhanced Type-3 HARQ-ACK codebook specifically for SPS PDSCH needs further discussion.

SUMMARY

According to an aspect of the present disclosure, there is provided a codebook feedback method, performed by a terminal, including reporting an enhanced Type 3 Hybrid Automatic Repeat Request Acknowledgement (HARQ-ACK) codebook specifically for Semi-Persistent Scheduling (SPS) Physical Downlink Shared Channel (PDSCH) to an access network device in response to a trigger rule being satisfied.

According to an aspect of the present disclosure, there is provided a codebook feedback method, performed by an access network device, including sending a trigger message and/or a configuration message for an enhanced Type 3 HARQ-ACK codebook specifically for SPS PDSCH in response to a trigger rule being satisfied; receiving the enhanced Type 3 HARQ-ACK codebook specifically for SPS PDSCH reported by a terminal.

According to an aspect of the present disclosure, there is provided a codebook feedback device, applied to a terminal, including a sending module for reporting an enhanced Type 3 Hybrid Automatic Repeat Request Acknowledgement HARQ-ACK codebook specifically for Semi-Persistent Scheduling SPS Physical Downlink Shared Channel PDSCH to an access network device in response to a trigger rule being satisfied.

According to an aspect of the present disclosure, there is provided a codebook feedback device, applied to an access network device, including a sending module for sending a trigger message and/or a configuration message for an enhanced Type 3 HARQ-ACK codebook specifically for SPS PDSCH in response to a trigger rule being satisfied; a receiving module for receiving the enhanced Type 3 HARQ-ACK codebook specifically for SPS PDSCH reported by a terminal.

According to an aspect of the present disclosure, there is provided a terminal device, including: a processor; and a transceiver coupled to the processor; where the processor is configured to load and execute executable instructions to implement the codebook feedback method described above.

According to an aspect of the present disclosure, there is provided an access network device, including: a processor; and a transceiver coupled to the processor; where the processor is configured to load and execute executable instructions to implement the codebook feedback method described above.

According to an aspect of the present disclosure, there is provided a computer-readable storage medium, where the computer-readable storage medium stores therein at least one instruction, at least one segment of a program, a code set, or a set of instructions, the at least one instruction, the at least one segment of a program, the code set, or the set of instructions is loaded and executed by a processor to implement a codebook feedback method described above.

BRIEF DESCRIPTION OF THE DRAWINGS

The accompanying drawings of the present disclosure will be briefly introduced below, and it will be obvious that the accompanying drawings in the following description are only some of the embodiments of the present disclosure, and that other embodiments can be obtained by those skilled in the art.

DETAILED DESCRIPTION

Embodiments will be described herein in detail, examples of which are represented in the accompanying drawings.

When the following description relates to the accompanying drawings, unless otherwise indicated, the same reference numbers in different accompanying drawings indicate the same or similar elements. The embodiments described in the following embodiments do not represent all embodiments consistent with the present disclosure. Rather, they are only examples of devices and methods consistent with some aspects of the present disclosure as detailed in the appended claims.

The term used in this disclosure is used solely for the purpose of describing particular embodiments and is not intended to limit the present disclosure. The singular forms of "a", "said", and "the" as used in this disclosure and the appended claims are also intended to encompass the majority form, unless the context clearly indicates other meaning. It should also be understood that the term "and/or" as used herein refers to and encompasses any or all possible combinations of one or more of the associated listed items.

It should be understood that while the terms first, second, third, etc. may be used in the present disclosure to describe various pieces of information, such information should not be limited to these terms. These terms are used only to distinguish the same type of information from one another. For example, without departing from the scope of the present disclosure, first information may also be referred to as second information, and similarly, second information may be referred to as first information. Depending on the context, for example, the term "if" as used herein may be interpreted as "at . . . " or "when . . . " or "in response to determining".

Figure 1:
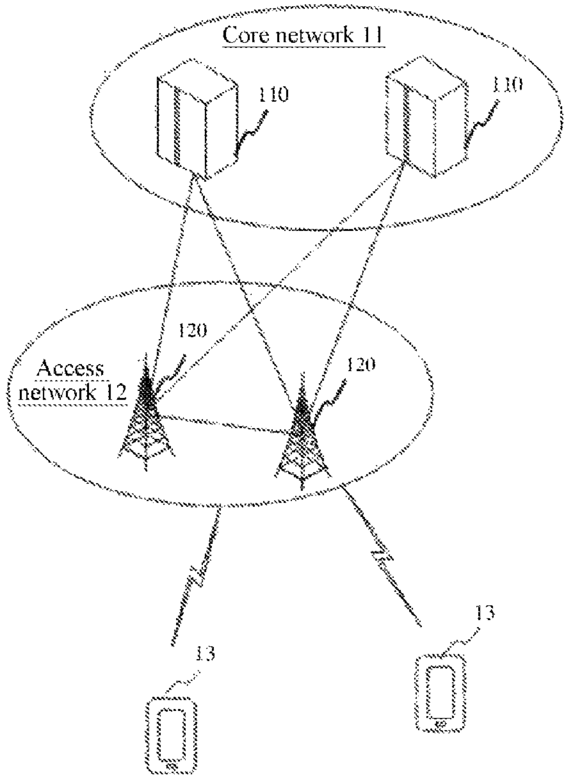
FIG. 1 illustrates a block diagram of a communication system provided by an embodiment of the present disclosure.

FIG. 1 illustrates a block diagram of a communication system provided by an embodiment of the present disclosure, which may include: a core network 11, an access network 12, and a terminal 13.

The core network 11 includes a number of core network devices 110. The core network devices 110 include Access and Mobility Management Function (AMF), Session Management Function (SMF), and User Plane Function (UPF) devices, among others. The AMF is used to control access authorities of terminals and functions such as switching, and the SMF is used to provide server continuity, uninterrupted user experience of servers, such as Internet Protocol (IP) address and anchor point changes, etc.

The access network 12 includes a number of access network devices 120. The access network devices 120 may be base stations, which are devices deployed in the access network to provide wireless communication functions for terminals. The base stations may include various forms of macro base stations, micro base stations, relay stations, access points, and the like. In systems that use different wireless access technologies, the name of the device with the base station function may be different, for example, in the Long Term Evolution (LTE) system, it is called eNodeB or eNB; in the 5G New Radio (NR) system, it is called gNode B or gNB. As communication technologies evolve, the name "base station" may change in description. For convenience, in the embodiments of the present disclosure, the above-described devices providing wireless communication functions for the terminal are collectively referred to as access network devices.

The terminal 13 may include various handheld devices, in-vehicle devices, wearable devices, computing devices, or other processing devices connected to a wireless modem, as well as various forms of User Equipment (UE), Mobile Station (MS), terminal device, and so on, that have wireless communication functions. For ease of description, the devices mentioned above are collectively referred to as terminals. The access network device 120 and the terminal 13 communicate with each other via some kind of radio interface technology, such as a Uu interface. The 5G-based industrial sensors, video surveillance, and wearable devices and so on do not need to support such large bandwidths, especially industrial sensors require only a few megabytes of transmission bandwidth. Such terminals may be categorized as a new type of terminal in subsequent versions of 5G enhancements, with corresponding improvements in technical characteristics.

In some examples, in the process of wireless communication between the terminal 13 and the access network device 120 as described above, the wireless communication may be carried out over an authorized frequency band or over an unauthorized frequency band.

Type-3 codebook is introduced in R16 (New Radio Based Unlicensed Access, NR-U), and when the UE receives one-shot HARQ-ACK feedback triggered by the base station via DCI, the UE generates a Type-3 HARQ-ACK codebook including HARQ-ACK information corresponding to all HARQs on all configured carriers in one group of the Physical Uplink Control Channel (PUCCH).

The R17 URLLC topic includes Type-3 codebook in the discussion to retransmit HARQ-ACKs that have been canceled or discarded due to resource collisions or priority issues, but Type-3 codebook has the disadvantage of high overhead, so it is important to make further enhancement to Type-3 codebook to reduce the feedback overhead of Type-3 codebook.

The size of the enhanced Type 3 HARQ-ACK codebook is not flexible and can be activated by the RRC configuration. Also, M RRC-applicable enhanced Type 3 HARQ-ACK codebooks can be configured by the Radio Resource Control (RRC) based on dynamic DCI indication, with M being a positive integer, e.g., enhanced Type 3 HARQ-ACK codebooks for different subset of cells, for different HARQ processes, and specifically for SPS PDSCH, and one of the codebooks are selected by the dynamic DCI.

In embodiments of the present disclosure, the determination of the trigger rule is mainly for the enhanced Type 3 HARQ-ACK codebook specifically for SPS PDSCH.

The following issues are primarily addressed:

1. For Downlink Grant (DG) Physical Downlink Shared Channel (PDSCH) transmissions, each PDSCH transmission is accompanied by scheduling Downlink Control Information (DCI) and T-domain indications indicating at any time whether or not to trigger Type-3 codebook feedback, whereas for enhanced Type-3 HARQ-ACK codebook containing only SPS PDSCH, there is no corresponding scheduling DCI and T-domain indication indicating whether or not to trigger feedback for this transmission. The SPS PDSCH is usually transmitted by RRC semi-static configuration. When to trigger, or what conditions are met to trigger the type-3 codebook feedback needs to be considered.

In the embodiments of the present disclosure, some trigger conditions and rules are defined to trigger the enhanced type-3 HARQ-ACK codebook feedback containing only SPS PDSCH with a certain time unit or rule, which can reduce the triggering overhead, and also can avoid misunderstanding between the base station and the UE when the DCI is triggered by a discarded or misinterpreted code.

2. For the enhanced Type-3 HARQ-ACK codebook containing only SPS PDSCH, the SPS PDSCH reserves resources with a certain period, but the base station may not generate the actual transmission but skip these transmission resources, i.e., there are non-skipped SPS PDSCH and skipped SPS PDSCH, and they are invisible to the UE. This makes it difficult to predict and calculate the codebook size.

In embodiments of the present disclosure, a corresponding indication is utilized to determine the codebook size of an enhanced Type-3 HARQ-ACK codebook containing only SPS PDSCH, or a uniform rule is defined so that both the base station and the UE can calculate the codebook size of an enhanced Type-3 HARQ-ACK codebook containing only SPS PDSCH, and the uniformity is maintained between the base station and the UE.

Figure 2:
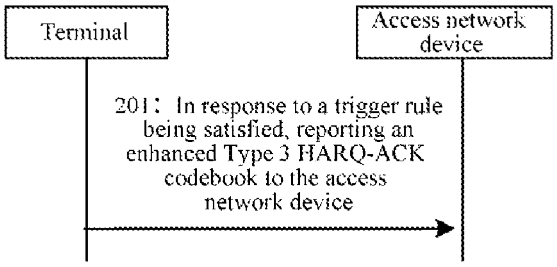
FIG. 2 illustrates a flowchart of a codebook feedback method provided by an embodiment of the present disclosure.

The present disclosure provides a codebook feedback method, please refer to FIG. 2, which illustrates a flowchart of a codebook feedback method provided by an embodiment of the present disclosure. The method is applied to a terminal, for example, as shown in FIG. 2, and the method includes the following steps.

Step 201, in response to a trigger rule being satisfied, reporting an enhanced Type 3 HARQ-ACK codebook to an access network device.

In some examples, the enhanced Type 3 HARQ-ACK codebook is an enhanced Type 3 HARQ-ACK codebook specifically for SPS PDSCH. In the embodiments of the present disclosure, the enhanced Type 3 HARQ-ACK codebook specifically for SPS PDSCH is illustrated as an example.

The trigger rule includes at least one of the following rules:

- First, the protocol predefines a fixed trigger period;
- Second, a trigger period for the codebook is determined based on a predefined rule;
- Third, codebook feedback is performed based on a predefined threshold;
- Fourth, based on a UE caching capability, i.e., an upper limit on the number of HARQ-ACKs cached by the terminal;
- Fifth, based on the request trigger message reported by the UE.

The above schemes are described respectively.

First, the protocol predefines a fixed trigger period.

That is, the trigger rule includes triggering based on a certain trigger period, which is the period for triggering the report of the enhanced Type 3 HARQ-ACK codebook specifically for SPS PDSCH.

The fixed trigger period is determined based on a predefinition of the protocol. Schematically, a feedback of the enhanced Type 3 HARQ-ACK codebook specifically for SPS PDSCH is triggered once fixedly every N time slots.

In some examples, the terminal feeds back the enhanced Type 3 HARQ-ACK codebook specifically for SPS PDSCH once every N time slots; alternatively, the access network device periodically sends a trigger message to the terminal once every N time slots, whereby the terminal feeds back the enhanced Type 3 HARQ-ACK codebook specifically for SPS PDSCH to the access network device. The trigger message may be sent by the DCI or may also be sent by the RRC.

Second, a trigger period of the codebook is determined based on a predefined rule.

That is, the trigger rule includes a trigger period, and the trigger period is a period for triggering the report of the enhanced Type 3 HARQ-ACK codebook specifically for SPS PDSCH.

The predefined rule may be based on one or more operational values of the SPS PDSCH configuration period, the feedback K1 value, and the time window.

Schematically, if the SPS PDSCH configuration period is 4 and the predefined rule is 5 times the SPS PDSCH configuration period, then the feedback of the enhanced Type 3 HARQ-ACK codebook specifically for SPS PDSCH is triggered once every 20 time slots.

Schematically, if the feedback K1 value is 4, then the feedback of the enhanced Type 3 HARQ-ACK codebook specifically for SPS PDSCH is triggered once every 16 time slots.

Schematically, based on the time window, the feedback of the enhanced Type 3 HARQ-ACK codebook specifically for SPS PDSCH is triggered once every M-th time window; or, the feedback of the enhanced Type 3 HARQ-ACK codebook specifically for SPS PDSCH is triggered once every M time windows.

The trigger period may be determined based on one of the SPS PDSCH configuration period, the feedback K1 value, and the time window, as well as the predefined rule, or it may be determined based on more than one of the SPS PDSCH configuration period, the feedback K1 value, and the time window, as well as the predefined rule, which is not limited by embodiments of the present disclosure.

Third, codebook feedback is performed based on a predefined threshold.

That is, the trigger rule includes triggering by satisfying a preset threshold. The preset threshold includes at least one of the following cases:

3.1 The preset threshold is the number of times the access network device does not receive the SPS HARQ-ACK feedback.

Schematically, when the number of times the access network device does not received the SPS HARQ-ACK feedback reaches or exceeds M times, the feedback of the enhanced Type 3 HARQ-ACK codebook specifically for SPS PDSCH is triggered.

3.2 The preset threshold is a length of time that the access network device does not receive SPS HARQ-ACK feedback.

Schematically, when the access network device does not receive the SPS HARQ-ACK feedback for a period of time of M time units or more, the feedback of the enhanced Type 3 HARQ-ACK codebook specifically for SPS PDSCH is triggered.

The time units can be milliseconds, time slots, sub-time slots, time windows, repetition, etc.

3.3 The preset threshold is a number of times the access network device skips the SPS PDSCH.

Schematically, when the number of times the access network device skips SPS PDSCH transmissions accumulates to M times, the feedback of the enhanced Type 3 HARQ-ACK codebook specifically for SPS PDSCH is triggered.

3.4 The preset threshold is a length of time that the access network device skips the SPS PDSCH.

Schematically, when the length of time that the access network device skips the SPS PDSCH reaches or exceeds M time units, the feedback of the enhanced Type 3 HARQ-ACK codebook specifically for the SPS PDSCH is triggered.

3.5 The preset threshold is a number of times the access network device actually transmits the SPS PDSCH.

Schematically, when the number of times the access network device actually transmits the SPS PDSCH accumulates to M times, the feedback of the enhanced Type 3 HARQ-ACK codebook specifically for SPS PDSCH is triggered.

3.6 The preset threshold is a number of times the terminal continuously successfully decodes the SPS PDSCH.

Schematically, when the number of times the terminal successfully decodes SPS PDSCH continuously reaches M times, the feedback of the enhanced Type 3 HARQ-ACK codebook specifically for SPS PDSCH is triggered.

3.7 The preset threshold is a number of times the terminal continuously non-successfully decodes the SPS PDSCH.

Schematically, when the number of times the terminal non-successfully decodes SPS PDSCH continuously reaches M times, the feedback of the enhanced Type 3 HARQ-ACK codebook specifically for the SPS PDSCH is triggered.

Fourth, codebook feedback is performed based on UE caching capability.

That is, the trigger rule includes the terminal reporting the UE caching capability, and the UE caching capability is used to indicate an upper limit on the number of HARQ-ACKs cached by the terminal.

In some embodiments, the terminal reports the UE caching capability to the access network device, i.e., the terminal reports a UE capability message to the access network device, and the UE capability message is used to indicate the UE caching capability of the terminal. Schematically, the UE caching capability is used to indicate that the feedback of the enhanced Type 3 HARQ-ACK codebook specifically for SPS PDSCH is required once for up to M decoding results of the terminal. The access network device triggers the enhanced Type-3 codebook with a 1-bit indication of the DCI before the caching capability value M is exceeded; alternatively, the terminal implicitly triggers feedback of the enhanced Type 3 HARQ-ACK codebook specifically for SPS PDSCH before the caching capability value M is exceeded.

In some embodiments, the terminal receives a trigger message. The trigger message includes a first indication field. The first indication field is used to trigger the terminal to report the enhanced Type 3 HARQ-ACK codebook specifically for SPS PDSCH. Then, the terminal reports the enhanced Type 3 HARQ-ACK codebook specifically for SPS PDSCH to the access network device based on the trigger message. This trigger message can be realized as DCI signaling. That is, the feedback of the enhanced Type 3 HARQ-ACK codebook specifically for SPS PDSCH is triggered by a trigger message. The trigger message includes a DCI trigger message, an RRC trigger message, or a MAC-CE trigger message. In some examples, the report of the enhanced Type 3 HARQ-ACK codebook specifically for SPS PDSCH is triggered by 1 bit in the DCI.

Fifth, based on a request trigger message reported by the UE.

That is, the terminal sends a request trigger message to the access network device each time it needs to report the enhanced Type 3 HARQ-ACK codebook specifically for SPS PDSCH, thereby triggering the report of the enhanced Type 3 HARQ-ACK codebook specifically for SPS PDSCH In some examples, the feedback triggering method for the enhanced Type 3 HARQ-ACK codebook specifically for SPS PDSCH includes at least one of the following methods:

1. Based on RRC configuration+trigger message.

That is, in response to the trigger rule being satisfied, the terminal receives a configuration message sent by the access network device, and the configuration message includes a second indication field.

The second indication field is used to indicate a HARQ-ACK process ID; or, the second indication field is used to indicate statistics of the HARQ-ACK, and the statistics are used to indicate the number of times the HARQ-ACK has been fed back; or, the second indication field is used to indicate codebook size of an enhanced Type 3 HARQ-ACK codebook specifically for SPS PDSCH.

After the access network device sends a configuration message, i.e., RRC signaling, to the terminal, the access network device sends DCI signaling, i.e., a trigger message, to the terminal, instructing the terminal to report the enhanced Type 3 HARQ-ACK codebook specifically for SPS PDSCH.

In some examples, the RRC signaling contains only the number of times the SPS PDSCH HARQ-ACK has been fed back or HARQ-ACK ID information.

2. Based on UE request+trigger message.

That is, in response to the trigger rule being satisfied, a request trigger message is sent to the access network device, and the request trigger message is used to request triggering of the enhanced Type 3 HARQ-ACK codebook specifically for SPS PDSCH. In some examples, the request trigger message includes a third indication field, and the third indication field is used to indicate a HARQ-ACK process ID; or, the third indication field is used to indicate statistics of HARQ-ACK, and the statistics is used to indicate the number of times the HARQ-ACK has been fed back; or, the third indication field is used to indicate the codebook size of the enhanced Type 3 HARQ-ACK codebook specifically for SPS PDSCH.

After the terminal sends a request trigger message to the access network device, the access network device sends DCI signaling, i.e., a trigger message, to the terminal, instructing the terminal to report the enhanced Type 3 HARQ-ACK codebook specifically for SPS PDSCH.

In some examples, the UE request trigger message contain the number of times the SPS PDSCH HARQ-ACK to be fed back by UE or HARQ-ACK ID information, which is fed back.

3. Based on the UE capability report+trigger message.

That is, the terminal sends a UE capability message to the access network device, and the UE capability message is used to indicate the UE caching capability of the terminal, that is, the upper limit on the number of HARQ-ACKs cached by the terminal.

In some examples, the UE reports the maximum HARQ-ACK cache value of the terminal, e.g., one feedback is required for up to M decoding results, then the access network device triggers the feedback of the enhanced Type 3 HARQ-ACK codebook specifically for SPS PDSCH with a 1-bit indication of the DCI before the cache value is exceeded.

4. Based on predefined rule+trigger message.

That is, the access network device sends a trigger signaling to the terminal when this predefined rule is satisfied.

Based on the predefined rule, both the access network device and the terminal are able to determine the number of times HARQ-ACK to be fed back and the codebook size.

5. Triggering based on the predefined rule.

That is, when the predefined rule is satisfied, the terminal automatically feeds back the HARQ-ACK codebook to the access network device.

In summary, the codebook feedback method provided by embodiments of the present disclosure triggers the enhanced Type-3 HARQ-ACK codebook by means of a pre-determined trigger rule when the trigger rule is satisfied, thereby determining the reporting occasion for reporting the enhanced Type 3 HARQ-ACK codebook to the access network device.

Figure 3:
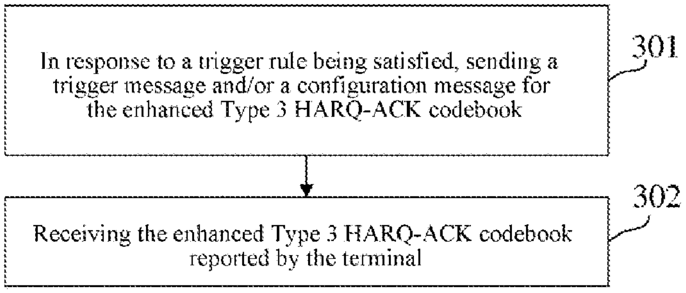
FIG. 3 illustrates a flowchart of a codebook feedback method provided by another embodiment of the present disclosure.

In some embodiments, the access network device receives an enhanced Type 3 HARQ-ACK codebook from a terminal based on a trigger rule. FIG. 3 is a flowchart of a codebook feedback method provided by an embodiment of the present disclosure. The method is applied to an access network device, for example, and as shown in FIG. 3, the method includes the following steps.

Step 301, in response to a trigger rule being satisfied, sending a trigger message and/or a configuration message for the enhanced Type 3 HARQ-ACK codebook.

In some examples, the enhanced Type 3 HARQ-ACK codebook is an enhanced Type 3 HARQ-ACK codebook specifically for SPS PDSCH. In the embodiments of the present disclosure, the enhanced Type 3 HARQ-ACK codebook specifically for SPS PDSCH is illustrated as an example.

The trigger rule includes at least one of the following rules:

First, the protocol predefines a fixed trigger period;

Second, a trigger period for the codebook is determined based on the predefined rule;

Third, codebook feedback is performed based on a predefined threshold;

Fourth, based on a UE caching capability, i.e., an upper limit on the number of HARQ-ACKs cached by the terminal.

Fifth, based on the request trigger message reported by the UE.

The above schemes are described respectively.

First, the protocol predefines a fixed trigger period.

That is, the trigger rule includes triggering based on a certain trigger period, which is the period for triggering the report of the enhanced Type 3 HARQ-ACK codebook specifically for SPS PDSCH.

The fixed trigger period is determined based on a predefinition of the protocol. Schematically, a feedback of the enhanced Type 3 HARQ-ACK codebook specifically for SPS PDSCH is triggered once fixedly every N time slots.

Second, a trigger period of the codebook is determined based on a predefined rule.

That is, the trigger rule includes a trigger period, and the trigger period is a period for triggering the report of the enhanced Type 3 HARQ-ACK codebook specifically for SPS PDSCH.

The predefined rule includes based on one or more operational values among the SPS PDSCH configuration period, the feedback K1 value, and the time window.

Third, codebook feedback is performed based on a predefined threshold.

That is, the trigger rule includes triggering by satisfying a preset threshold. The preset threshold is the number of times the access network device does not receive the SPS HARQ-ACK feedback; or, the preset threshold is the number of times the access network device skips the SPS PDSCH; or, the preset threshold is the number of times the access network device actually transmits the SPS PDSCH; or, the preset threshold is the number of times the terminal continuously successfully decodes the SPS PDSCH; or, the preset threshold is the number of times the terminal continuously non-successfully decodes SPS PDSCH.

Fourth, codebook feedback is performed based on UE caching capability.

That is, the trigger rule includes the terminal reporting the UE caching capability, and the UE caching capability is used to indicate an upper limit on the number of HARQ-ACKs cached by the terminal.

In some embodiments, the terminal reports the UE caching capability to the access network device, i.e., the terminal reports a UE capability message to the access network device, and the UE capability message is used to indicate the UE caching capability of the terminal. Schematically, the UE caching capability is used to indicate that the feedback of the enhanced Type 3 HARQ-ACK codebook specifically for SPS PDSCH is required once for up to M decoding results of the terminal. The access network device triggers the enhanced Type-3 codebook with a 1-bit indication of the DCI before the caching capability value M is exceeded; alternatively, the terminal implicitly triggers the feedback of the enhanced Type 3 HARQ-ACK codebook specifically for SPS PDSCH before the caching capability value M is exceeded.

Fifth, based on a request trigger message reported by the UE.

That is, the terminal sends a request trigger message to the access network device each time it needs to report the enhanced Type 3 HARQ-ACK codebook specifically for SPS PDSCH, thereby triggering the report of the enhanced Type 3 HARQ-ACK codebook specifically for SPS PDSCH.

In some embodiments, the message sent by the access network device to the terminal includes the following scenario.

The access network device sends a trigger message to the terminal. The trigger message may be realized as a DCI trigger message, an RRC trigger message, or a MAC-CE trigger message, i.e., the access network device sends the trigger message to the terminal, the trigger message includes a first indication field, and the first indication field is used to trigger the terminal to report the enhanced Type 3 HARQ-ACK codebook specifically for SPS PDSCH.

In some examples, the access network device sends the trigger message to the terminal when it determines that the trigger rule is satisfied, triggering the terminal to report the enhanced Type 3 HARQ-ACK codebook specifically for SPS PDSCH. Schematically, the access network device sends the trigger message to the terminal when it determines that the HARQ-ACK currently cached by the terminal is about to reach the upper limit of the caching capability.

Alternatively, when the trigger rule is satisfied, the access network device receives a request trigger message from the terminal and sends a trigger message to the terminal based on the request trigger message. The request trigger message is used to request triggering of an enhanced Type 3 HARQ-ACK codebook specifically for SPS PDSCH. The request trigger message includes a third indication field, and the third indication field is used to indicate a process ID of the HARQ-ACK; or, the third indication field is used to indicate statistics of the HARQ-ACK, and the statistics is used to indicate the number of feedbacks; or, the third indication field is used to indicate a codebook size of the enhanced Type 3 HARQ-ACK codebook specifically for SPS PDSCH.

Alternatively, the access network device first sends a configuration message, e.g., an RRC configuration message, to the terminal device when determining the trigger rule being satisfied, and the configuration message includes a second indication field, and the second indication field is used to indicate the process ID of the HARQ-ACK; or, the second indication field is used to indicate the statistics of the HARQ-ACK, and the statistics are used to indicate the number of feedbacks; or, the second indication field is used to indicate the codebook size of the enhanced Type 3 HARQ-ACK codebook specifically for SPS PDSCH. After sending the configuration message to the terminal, a trigger message is sent to the terminal to trigger the terminal to report the enhanced Type 3 HARQ-ACK codebook specifically for SPS PDSCH.

Step 302, receiving the enhanced Type 3 HARQ-ACK codebook reported by the terminal.

In some embodiments, the terminal reports the enhanced Type 3 HARQ-ACK codebook specifically for SPS PDSCH after receiving the trigger message sent by the access network device.

It is to be noted that, the above embodiments are illustrated with the access network device triggering the terminal to report the enhanced Type 3 HARQ-ACK codebook specifically for SPS PDSCH via the trigger message, and in some embodiments, the terminal may also directly report the enhanced Type 3 HARQ-ACK codebook specifically for SPS PDSCH when the trigger rule is satisfied.

In summary, the codebook feedback method provided by embodiments of the present disclosure triggers the enhanced Type-3 HARQ-ACK codebook by means of a pre-determined trigger rule when the trigger rule is satisfied, thereby determining the reporting occasion for reporting the enhanced Type 3 HARQ-ACK codebook to the access network device.

Figure 4:
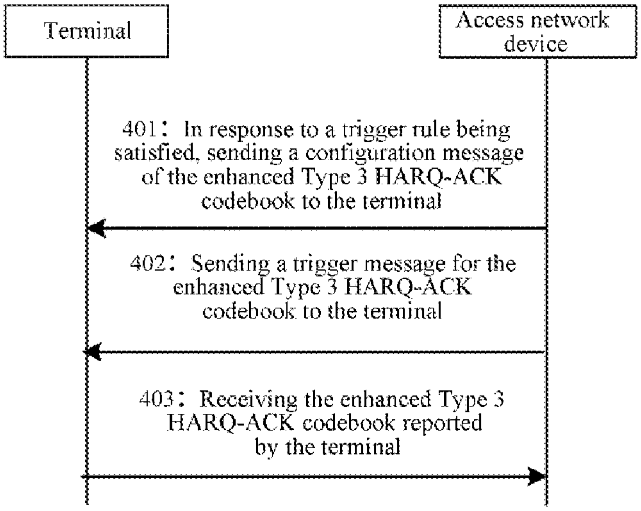
FIG. 4 illustrates a flowchart of a codebook feedback method provided by another embodiment of the present disclosure.

For the scheme of RRC signaling+trigger message, FIG. 4 is a flowchart of a codebook feedback method provided by an embodiment of the present disclosure. Taking the method being applied to a communication system including a terminal and an access network device as an example, as shown in FIG. 4, the method includes the following steps.

Step 401, in response to a trigger rule being satisfied, the access network device sends a configuration message of the enhanced Type 3 HARQ-ACK codebook to the terminal.

In some examples, the enhanced Type 3 HARQ-ACK codebook is an enhanced Type 3 HARQ-ACK codebook specifically for SPS PDSCH. In the embodiments of the present disclosure, the enhanced Type 3 HARQ-ACK codebook specifically for SPS PDSCH is illustrated as an example.

That is, in response to the trigger rule being satisfied, the access network device sends RRC signaling to the terminal, the RRC signaling includes a second indication field, and the second indication field is used to indicate a process ID of the HARQ-ACK; or, the second indication field is used to indicate statistics of the HARQ-ACK, and the statistics are used to indicate the number of feedbacks; or, the second indication field is used to indicate a codebook size of an enhanced Type 3 HARQ-ACK codebook specifically for SPS PDSCH. Thereby, the terminal and the server are able to harmonize the number of HARQ-ACK feedbacks, and are able to harmonize the codebook size.

It is to be noted that, the above embodiment is illustrated with the configuration message being realized as RRC signaling, and in some examples, the configuration message may also be realized as DCI signaling.

Step 402, the access network device sends a trigger message for the enhanced Type 3 HARQ-ACK codebook to the terminal.

That is, the access network device sends a trigger message to the terminal to trigger the terminal to report the enhanced Type 3 HARQ-ACK codebook specifically for SPS PDSCH, and the trigger message includes a DCI trigger message, an RRC trigger message, or a MAC-CE trigger message.

Step 403, the access network device receives the enhanced Type 3 HARQ-ACK codebook reported by the terminal.

The terminal performs the reporting of the enhanced Type 3 HARQ-ACK codebook specifically for SPS PDSCH according to the trigger message.

Figure 5:
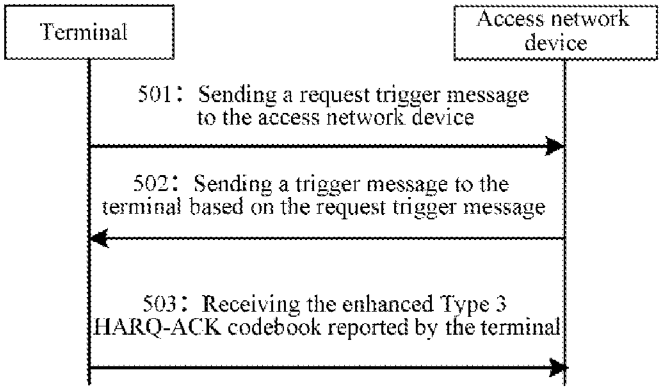
FIG. 5 illustrates a flowchart of a codebook feedback method provided by another embodiment of the present disclosure.

For the scheme of request trigger message+trigger message, FIG. 5 is a flowchart of a codebook feedback method provided by an embodiment of the present disclosure. Taking the method being applied to a communication system including a terminal and an access network device as an example, as shown in FIG. 5, and the method includes the following steps.

Step 501, the terminal sends a request trigger message to the access network device.

The request trigger message is used to request triggering of an enhanced Type 3 HARQ-ACK codebook.

In some examples, the enhanced Type 3 HARQ-ACK codebook is an enhanced Type 3 HARQ-ACK codebook specifically for SPS PDSCH. In the embodiments of the present disclosure, the enhanced Type 3 HARQ-ACK codebook specifically for SPS PDSCH is illustrated as an example.

Step 502, the access network device sends a trigger message to the terminal based on the request trigger message.

That is, the access network device sends a trigger message to the terminal based on the request trigger message, to trigger the terminal to report the enhanced Type 3 HARQ-ACK codebook specifically for SPS PDSCH, and the trigger message includes a DCI trigger message, an RRC trigger message, or a MAC-CE trigger message.

Step 503, the access network device receives the enhanced Type 3 HARQ-ACK codebook reported by the terminal.

The terminal performs the reporting of the enhanced Type 3 HARQ-ACK codebook specifically for SPS PDSCH based on the trigger message.

Figure 6:
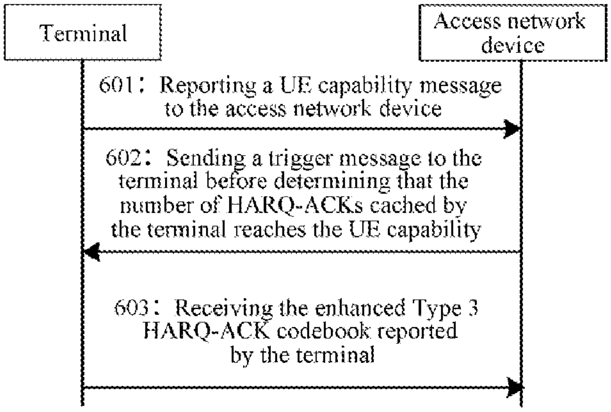
FIG. 6 illustrates a flowchart of a codebook feedback method provided by another embodiment of the present disclosure.

For the scheme of UE capability+trigger message, FIG. 6 is a flowchart of a codebook feedback method provided by an embodiment of the present disclosure. Taking the method being applied to a communication system including a terminal and an access network device as an example, as shown in FIG. 6, the method includes the following steps.

Step 601, the terminal reports a UE capability message to the access network device.

The UE capability message is used to indicate a UE caching capability of the terminal, wherein the UE caching capability is an upper limit on the number of HARQ-ACKs cached by the terminal.

Step 602, the access network device sends a trigger message to the terminal before determining that the number of HARQ-ACKs cached by the terminal reaches the UE capability.

That is, the access network device sends a trigger message, which includes a DCI trigger message, an RRC trigger message, or a MAC-CE trigger message, to the terminal before judging that the number of HARQ-ACKs cached by the terminal reaches the UE capability during the transmission of the PDSCH.

Step 603, the access network device receives the enhanced Type 3 HARQ-ACK codebook reported by the terminal.

In some examples, the enhanced Type 3 HARQ-ACK codebook is an enhanced Type 3 HARQ-ACK codebook specifically for SPS PDSCH. In the embodiments of the present disclosure, the enhanced Type 3 HARQ-ACK codebook specifically for SPS PDSCH is illustrated as an example.

The terminal performs reporting of the enhanced Type 3 HARQ-ACK codebook specifically for SPS PDSCH based on the trigger message.

Figure 7:
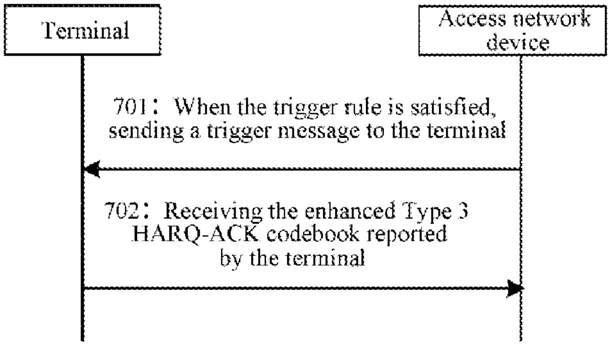
FIG. 7 illustrates a flowchart of a codebook feedback method provided by another embodiment of the present disclosure.

For the scheme of preset rules+trigger message, FIG. 7 is a flowchart of a codebook feedback method provided by an embodiment of the present disclosure. Taking the method being applied to a communication system including a terminal and an access network device as an example, as shown in FIG. 7, the method includes the following steps.

Step 701, when the trigger rule is satisfied, the access network device sends a trigger message to the terminal.

That is, the access network device sends a trigger message, which includes a DCI trigger message, an RRC trigger message, or a MAC-CE trigger message, to the terminal when it determines that the current communication satisfies the trigger rule.

Step 702, the access network device receives the enhanced Type 3 HARQ-ACK codebook reported by the terminal.

In some examples, the enhanced Type 3 HARQ-ACK codebook is an enhanced Type 3 HARQ-ACK codebook specifically for SPS PDSCH. In the embodiments of the present disclosure, the enhanced Type 3 HARQ-ACK codebook specifically for SPS PDSCH is illustrated as an example.

The terminal performs reporting of the enhanced Type 3 HARQ-ACK codebook specifically for SPS PDSCH based on a trigger message.

Figure 8:
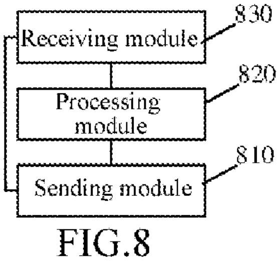
FIG. 8 illustrates a structural block diagram of a codebook feedback device provided by an embodiment of the present disclosure.

FIG. 8 is a structural block diagram of a codebook feedback device provided by an embodiment of the present disclosure. As shown in FIG. 8, the device includes a sending module 810 for reporting an enhanced Type 3 Hybrid Automatic Repeat Request Acknowledgement HARQ-ACK codebook to an access network device in response to a trigger rule being satisfied.

In an embodiment, the enhanced Type 3 HARQ-ACK codebook is a Type 3 HARQ-ACK codebook specifically for the Semi-Persistent Scheduling SPS Physical Downlink Shared Channel PDSCH.

In an embodiment, the trigger rule includes triggering based on a trigger period, and the trigger period is a period for triggering the reporting of the enhanced Type 3 HARQ-ACK codebook.

In an embodiment, the device further includes a processing module 820 for determining the trigger period predefined by the protocol; or a processing module 820 for determining the trigger period based on a predefined rule, where the predefined rule includes based on one or more of an SPS PDSCH configuration period, a feedback K1 value, a time window value.

In an embodiment, the trigger rule includes satisfying a preset threshold for triggering.

In an embodiment, the preset threshold is a number of times the access network device does not receive SPS HARQ-ACK feedback; or the preset threshold is a length of time that the access network device does not receive SPS HARQ-ACK feedback; or the preset threshold is a number of times the access network device skips the SPS PDSCH; or the preset threshold is a length of time that the access network device skips the SPS PDSCH; or the preset threshold is a number of times the access network device actually transmits the SPS PDSCH; or the preset threshold is a number of times the terminal continuously successfully decodes the SPS PDSCH; or the preset threshold is a number of times the terminal continuously non-successfully decodes the SPS PDSCH.

In an embodiment, the trigger rule includes reporting the UE caching capability, and the UE caching capability is used to indicate an upper limit on the number of HARQ-ACKs corresponding to the SPS PDSCH cached by the terminal.

In an embodiment, the sending module 810 is further configured to send a UE capability message to the access network device, and the UE capability message is used to indicate a UE caching capability of the terminal.

In an embodiment, the device further includes a receiving module 830 for receiving a trigger message, where the trigger message includes a first indication field, and the first indication field is used for triggering the terminal to report the enhanced Type 3 HARQ-ACK codebook. The sending module 810 is further configured to report the enhanced Type 3 HARQ-ACK codebook to the access network device based on the trigger message.

In an embodiment, the receiving module 830 is configured to receive, in response to the trigger rule being satisfied, a configuration message, where the configuration message includes a second indication field.

In an embodiment, the second indication field is used to indicate the HARQ-ACK process ID; or the second indication field is used to indicate statistics of the HARQ-ACK, and the statistics are used to indicate a number of feedbacks; or the second indication field is used to indicate a codebook size of the enhanced Type 3 HARQ-ACK codebook.

In an embodiment, the sending module 810 is further configured to send a request trigger message to the access network device in response to the trigger rule being satisfied, and the request trigger message is used to request the triggering of the enhanced Type 3 HARQ-ACK codebook.

In an embodiment, the request trigger message includes a third indication field; the third indication field is used to display a process ID indicative of the HARQ-ACK; or the third indication field is used to indicate statistics of the HARQ-ACK, and the statistics are used to indicate the number of feedbacks; or the third indication field is used to indicate a codebook size of the enhanced Type 3 HARQ-ACK codebook.

Figure 9:
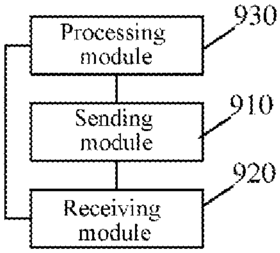
FIG. 9 illustrates a structural block diagram of a codebook feedback device provided by another embodiment of the present disclosure.

FIG. 9 is a structural block diagram of a codebook feedback device provided by an embodiment of the present disclosure, which, as shown in FIG. 9, includes a sending module 910 for sending a trigger message and/or a configuration message for an enhanced Type 3 HARQ-ACK codebook in response to a trigger rule being satisfied; a receiving module 920 for receiving the enhanced Type 3 HARQ-ACK codebook reported by the terminal.

In an embodiment, the enhanced Type 3 HARQ-ACK codebook is a Type 3 HARQ-ACK codebook specifically for the Semi-Persistent Scheduling SPS Physical Downlink Shared Channel PDSCH.

In an embodiment, the trigger rule includes triggering based on a trigger period, and the trigger period is a period for triggering the report of the enhanced Type 3 HARQ-ACK codebook.

In an embodiment, the device further includes: a processing module 930 for determining the trigger period predefined by the protocol; or a processing module 930 for determining the trigger period based on a predefined rule, where the predefined rule includes based on one or more of an SPS PDSCH configuration period, a feedback K1 value, a time window value.

In an embodiment, the trigger rule includes satisfying a preset threshold for triggering.

In an embodiment, the preset threshold is a number of times the access network device does not receive SPS HARQ-ACK feedback; or the preset threshold is a length of time that the access network device does not receive SPS HARQ-ACK feedback; or the preset threshold is a number of times the access network device skips the SPS PDSCH; or the preset threshold is a length of time that the access network device skips the SPS PDSCH; or the preset threshold is a number of times the access network device actually transmits the SPS PDSCH; or the preset threshold is a number of times the terminal continuously successfully decodes the SPS PDSCH; or the preset threshold is a number of times the terminal continuously non-successfully decodes the SPS PDSCH.

In an embodiment, the trigger rule includes receiving a UE caching capability reported by the terminal, and the UE caching capability is used to indicate an upper limit on the number of HARQ-ACKs corresponding to the SPS PDSCH cached by the terminal.

In an embodiment, the receiving module 920 is further configured to receive a UE capability message sent by the terminal, and the UE capability message is used to indicate a UE caching capability of the terminal.

In an embodiment, the sending module 910 is further configured to send a trigger message to the terminal, where the trigger message includes a first indication field, and the first indication field is used to trigger the terminal to report the enhanced Type 3 HARQ-ACK codebook.

In an embodiment, the sending module 910 is further configured to send a configuration message to the terminal in response to the trigger rule being satisfied, where the configuration message includes a second indication field.

In an embodiment, the second indication field is used to indicate the HARQ-ACK process ID; or the second indication field is used to indicate statistics of the HARQ-ACK, and the statistics are used to indicate the number of feedbacks; or the second indication field is used to indicate a codebook size of the enhanced Type 3 HARQ-ACK codebook.

In an embodiment, the receiving module 920 is further configured to receive a request trigger message sent by the terminal, and the request trigger message is used to request triggering of the enhanced Type 3 HARQ-ACK codebook.

In an embodiment, the request trigger message includes a third indication field; the third indication field is used to indicate a process ID of the HARQ-ACK; or the third indication field is used to indicate statistics of the HARQ-ACK, and the statistics are used to indicate the number of feedbacks; or the third indication field is used to indicate a codebook size of the enhanced Type 3 HARQ-ACK codebook.

Figure 10:
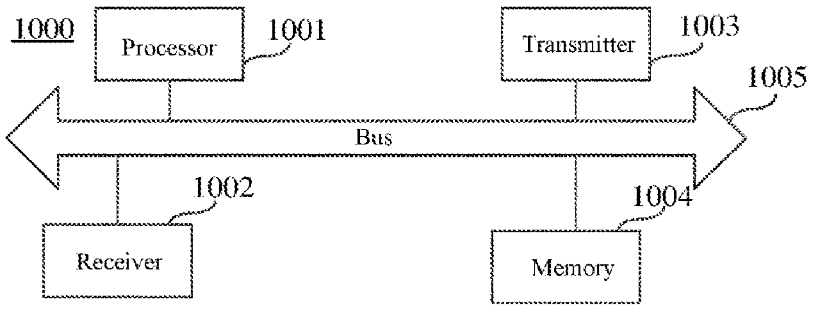
FIG. 10 illustrates a structural block diagram of a communication device illustrated by an embodiment of the present disclosure.

FIG. 10 illustrates a schematic diagram of a structure of a communication device 1000 (terminal device or network device) provided by an embodiment of the present disclosure. The communication device 1000 includes a processor 1001, a receiver 1002, a transmitter 1003, a memory 1004, and a bus 1005.

The processor 1001 includes one or more processing cores, and the processor 1001 performs various functional applications as well as information processing by running software programs as well as modules.

The receiver 1002 and the transmitter 1003 may be realized as a communication component, which may be a communication chip.

The memory 1004 is connected to the processor 1001 via a bus 1005.

The memory 1004 may be configured to store at least one instruction, and the processor 1001 is configured to execute the at least one instruction to implement the various steps in the method embodiment described above.

In addition, the memory 1004 may be implemented by any type of volatile or non-volatile storage device or a combination thereof. The volatile or non-volatile storage devices include, but are not limited to: magnetic disks or optical disks, Electrically Erasable Programmable Read Only Memory (EEPROM), Erasable Programmable Read Only Memory (EPROM), Static Random Access Memory (SRAM), Read-Only Memory (ROM), Magnetic Memory, Flash Memory, Programmable Read Only Memory (PROM).

An embodiment of the present disclosure also provides a codebook feedback system, and the system includes a terminal device and an access network device; the terminal device includes a codebook feedback device as provided by the embodiment shown in FIG. 8; the access network device includes a codebook feedback device as provided by the embodiment shown in FIG. 9.

An embodiment of the present disclosure further provides a computer-readable storage medium. The computer-readable storage medium has stored therein at least one instruction, at least one segment of a program, a code set, or a set of instructions. The at least one instruction, the at least one segment of a program, and the set of codes or the set of instructions is loaded and executed by the processor to implement the steps to be performed by the terminal in the codebook feedback method provided by the various method embodiments described above.

It should be understood that references herein to "a plurality of" mean two or more. The phrase "and/or", describing an association relationship of the associated objects, indicates that three kinds of relationships may exist, e.g., A and/or B may indicate the following three cases: the existence of A alone, the existence of both A and B, and the existence of B alone. The character "/" generally indicates that the associated objects are in an "or" relationship.

Other embodiments of the present disclosure will readily come to mind to those skilled in the art upon consideration of the specification and practice of the disclosure disclosed herein. The present disclosure is intended to cover any variations, uses, or adaptations of the present disclosure that follow the general principles of the present disclosure and that include common knowledge or customary means in the art not disclosed herein. The specification and embodiments are to be regarded as examples only, and the true scope and spirit of the present disclosure is indicated by the following claims.

It should be understood that the present disclosure is not limited to the precise structure which has been described above and illustrated in the accompanying drawings, and that various modifications and alterations may be made without departing from its scope. The scope of the present disclosure is limited only by the appended claims.

What is claimed is:

1. A codebook feedback method, performed by a terminal, comprising:

reporting an enhanced Type 3 Hybrid Automatic Repeat Request Acknowledgement (HARQ-ACK) codebook to an access network device in response to a trigger rule being satisfied, wherein the method further comprises:

sending a request trigger message to the access network device in response to the trigger rule being satisfied, wherein the request trigger message is configured to request triggering of the enhanced Type 3 HARQ-ACK codebook;

receiving a trigger message, wherein the trigger message comprises a first indication field, and the first indication field is configured to trigger the terminal to report the enhanced Type 3 HARQ-ACK codebook; and reporting the enhanced Type 3 HARQ-ACK codebook to the access network device based on the trigger message.

2. The method according to claim 1, wherein the enhanced Type 3 HARQ-ACK codebook is a Type 3 HARQ-ACK codebook specifically for Semi-Persistent Scheduling (SPS) Physical Downlink Shared Channel (PDSCH).

3. The method according to claim 1, wherein the trigger rule comprises triggering based on a trigger period, and the trigger period is a period for triggering reporting of the enhanced Type 3 HARQ-ACK codebook.

4. The method according to claim 3, further comprising:
determining the trigger period predefined by a protocol; or
determining the trigger period based on a predefined rule, wherein the predefined rule is based on one or more of an SPS PDSCH configuration period, a feedback K1 value, and a time window value.

5. The method according to claim 1, wherein the trigger rule comprises satisfying a preset threshold for triggering, wherein the preset threshold is one of:
a number of times the access network device does not receive SPS HARQ-ACK feedback;
a length of time the access network device does not receive SPS HARQ-ACK feedback;
a number of times the access network device skips SPS PDSCH;
a length of time the access network device skips SPS PDSCH;
a number of times the access network device actually transmits SPS PDSCH;
a number of times the terminal continuously successfully decodes SPS PDSCH; or
a number of times the terminal continuously non-successfully decodes SPS PDSCH.

6. The method according to claim 1, wherein the trigger rule comprises reporting a UE caching capability, and the UE caching capability indicates an upper limit on a number of HARQ-ACKs corresponding to SPS PDSCH cached by the terminal,
the method further comprising:
sending a UE capability message to the access network device, wherein the UE capability message indicates the UE caching capability of the terminal.

7. The method according to claim 1, further comprising:
receiving a configuration message in response to the trigger rule being satisfied, wherein the configuration message comprises a second indication field.

8. The method according to claim 7, wherein the second indication field indicates one of:
a process ID of the HARQ-ACK;
statistics of the HARQ-ACK, wherein the statistics indicate a number of feedbacks; or
a codebook size of the enhanced Type 3 HARQ-ACK codebook.

9. The method according to claim 1, wherein the request trigger message comprises a third indication field; and the third indication field indicates one of:
a process ID indicating the HARQ-ACK;
statistics of the HARQ-ACK, wherein the statistics indicate a number of feedbacks; or
a codebook size of the enhanced Type 3 HARQ-ACK codebook.

10. A codebook feedback method, performed by an access network device, comprising:
sending at least one of a trigger message or a configuration message for an enhanced Type 3 Hybrid Automatic Repeat Request Acknowledgement (HARQ-ACK) codebook in response to a trigger rule being satisfied; and
receiving the enhanced Type 3 HARQ-ACK codebook reported by a terminal,
wherein the method further comprises:
receiving a request trigger message sent by the terminal, wherein the request trigger message is configured to request triggering of the enhanced Type 3 HARQ-ACK codebook;
sending a configuration message to the terminal in response to the trigger rule being satisfied, wherein the configuration message comprises a second indication field; and
sending a trigger message to the terminal, wherein the trigger message comprises a first indication field, and the first indication field is configured to trigger the terminal to report the enhanced Type 3 HARQ-ACK codebook.

11. The method according to claim 10, wherein the enhanced Type 3 HARQ-ACK codebook is a Type 3 HARQ-ACK codebook specifically for Semi-Persistent Scheduling (SPS) Physical Downlink Shared Channel (PDSCH).

12. The method according to claim 11, wherein the trigger rule comprises triggering based on a trigger period, and the trigger period is a period for triggering reporting of the enhanced Type 3 HARQ-ACK codebook.

13. The method according to claim 10, wherein the trigger rule comprises satisfying a preset threshold for triggering, wherein the preset threshold is one of:
a number of times the access network device does not receive SPS HARQ-ACK feedback;
a length of time the access network device does not receive SPS HARQ-ACK feedback;
a number of times the access network device skips SPS PDSCH;
a length of time the access network device skips SPS PDSCH;
a number of times the access network device actually transmits SPS PDSCH;
a number of times the terminal continuously successfully decodes SPS PDSCH; or
a number of times the terminal continuously non-successfully decodes SPS PDSCH.

14. The method according to claim 10, wherein the trigger rule comprises receiving a UE caching capability reported by the terminal, and the UE caching capability indicates an upper limit on a number of HARQ-ACKs corresponding to SPS PDSCH cached by the terminal,
the method further comprising:
receiving a UE capability message sent by the terminal, wherein the UE capability message indicates the UE caching capability of the terminal.

15. An access network device, comprising:
a processor; and
a transceiver coupled to the processor;
wherein the processor is configured to perform the method of claim 10.

16. A terminal device, comprising:
a processor; and
a transceiver coupled to the processor;
wherein the processor is configured to:
report an enhanced Type 3 Hybrid Automatic Repeat Request Acknowledgement (HARQ-ACK) codebook to an access network device in response to a trigger rule being satisfied,
wherein the processor is further configured to:
sending a request trigger message to the access network device in response to the trigger rule being satisfied, wherein the request trigger message is configured to request triggering of the enhanced Type 3 HARQ-ACK codebook;

receiving a trigger message, wherein the trigger message comprises a first indication field, and the first indication field is configured to trigger the terminal to report the enhanced Type 3 HARQ-ACK codebook; and reporting the enhanced Type 3 HARQ-ACK codebook to the access network device based on the trigger message.

* * * * *